United States Patent Office 3,826,642
Patented July 30, 1974

3,826,642
HERBICIDE
Adolf Fischer, Mutterstadt, Germany, assignor to Badische Anilin- & Soda-Fabrik Aktiengesellschaft, Ludwigshafen (Rhine), Germany
No Drawing. Filed Mar. 11, 1970, Ser. No. 18,713
Int. Cl. A01n 9/14
U.S. Cl. 71—91                4 Claims

ABSTRACT OF THE DISCLOSURE

Herbicides containing a substituted benzothiadiazinone dioxide and at least one of a substituted decahydroquinazoline, a substituted polycyclic urea or a bromoaminopyridazone derivative as an additional active ingredient, and a process for controlling the growth of unwanted plants with these mixtures.

The invention relates to a herbicide containing a substituted benzothiadiazinone dioxide and at least one other active ingredient.

It is known to use

I 3-isopropyl-2,1,3-benzothiadiazinone-(4)-2,2-dioxide;
II 1-($\alpha,\alpha$-dimethyl-$\beta$-acetoxypropionyl)-3-isopropyl-2,4-dioxodecahydroquinazoline;
III N-[1- or 2-(3a,4,5,6,7,7a-hexahydro-4,7-methanoindanyl)]-N',N'-dimethylurea; and
IV 1-phenyl-4-amino-5-bromopyridazone-(6)

for controlling the growth of unwanted plants; however, their action is not satisfactory.

We have now found that mixtures comprising
(a) a compound having the formula

R denoting an isopropyl, ethyl or methyl radical or their salts (potassium, sodium or ammonium salts), and
(b) a compound having the formula R denoting an isopropyl, isobutyl, sec.-butyl or tert-butyl radical, or
(c) the compound having the formula (d) the compound having the formula or one of the following mixtures of the compounds:
$a+b+c$; $a+b+d$; $a+c+d$, have a better herbicidal, particularly selective herbicidal, action than the individual active ingredients.

The particular advantage of these mixtures is that they have an excellent action on most dicotyledonous and monocotyledonous weeds and favorable selectivity on important crop plants, e.g. rice, Indian corn, barley, wheat and rye.

The ratio of components a, b, c and d in the mixtures may be varied at will; those mixtures of the active ingredients are preferred which contain a and b or c or d in the weight ratio $a:b$ or c or d of 4:1 to 1:3.

The herbicides according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, the solution in water is suitable. However, hydrocarbons having boiling points higher than 150° C., e.g. tetrahydronaphthalene or alkylated naphthalenes, or organic liquids having boiling points higher than 150° C. and one or more than one functional group, e.g. the keto group, ether group, ester group or amide group, this group or these groups being attached as substituents to a hydrocarbon chain or being a component of a heterocyclic ring, may also be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredients, emulsifying or dispersing agent and possibly solvent.

Dusts may be prepared by mixing or grinding the active ingredients with a solid carrier, e.g. diatomaceous earth, talc, clay or fertilizers.

The mixtures may be used as such, or in admixture with insecticides, fungicides and fertilizers.

The following experiments demonstrate the application of the agents according to the invention.

EXAMPLE 1

In a greenhouse, the plants rice (*Oryza sativa*), Indian corn (*Zea mays*), morningglory species (Ipomoea sp.), ladysthumb (*Polygonum persicaria*), annual bluegrass (*Poa annua*), meadow grass (*Poa trivialis*), bermudagrass (*Cynodon dactylon*), barnyard grass (*Echinochloa crus-galli*), large crabgrass (*Digitaria sanguinalis*), witchgrass (*Panicum capillare*), green foxtail (*Setaria viridis*), giant foxtail (*Setaria faberii* (magna)), yellow foxtail (*Setaria glauca*), purple nutsedge (*Cyperus rotundus*), smallflower umbrella-plant (*Cyperus difformis*), yellow nutsedge (*Cyperus esculentus*), and tall umbrellaplant (*Cyperus eragrostis*) are treated at a growth height of from 3 to 20 cm. with 1 and 2 kg. per hectare of each of the following active ingredients I 3-isopropyl-2,1,3-benzothiadiazinone-(4)-2,2-dioxide,
II 1-(α,α-dimethyl-β-acetoxypropionyl)-3-isopropyl-2,4-dioxodecahydroquinazoline and with a mixture of active ingredients I and II (1 kg. per hectare of I+1 kg. per hectare of II), these amounts of the active ingredients each being dispersed in 500 liters of water per hectare. After a few days it is observed that the mixture of active ingredients I+II has, in comparison to the individual active ingredients I and II, a superior herbicidal action and more favorable selectivity on crop plants.

The results of the experiment are given in the following table:

|  | Active ingredient | | | | Mixture |
|---|---|---|---|---|---|
|  | I | | II | | I+II |
| Application rate kg./hectare | 1 | 2 | 1 | 2 | 1+1 |
| Crop plants: | | | | | |
| Oryza sativa | 0 | 0-10 | 0-10 | 30 | 0 |
| Zea mays | 0 | 0 | 0 | 20 | 0 |
| Unwanted plants: | | | | | |
| Ipomoea sp. | 50-60 | 80 | 70 | 100 | 100 |
| Polygonum persicaria | 90 | 100 | 70 | 90 | 100 |
| Poa annua | 0 | 10 | 90 | 90-100 | 90-100 |
| Poa trivialis | 0 | 10 | 90 | 90-100 | 90-100 |
| Cynodon dactylon | 10 | 20 | 80 | 90-100 | 100 |
| Echinochloa crus-galli | 10 | 20-30 | 80 | 90-100 | 90-100 |
| Digitaria sanguinalis | 0-10 | 10 | 70 | 90 | 80 |
| Panicum capillare | 0-10 | 10 | 80 | 90-100 | 80-90 |
| Setaria viridis | 10 | 20-30 | 80 | 100 | 90-100 |
| Setaria faberii (magna) | 0-10 | 10 | 70-80 | 90 | 80 |
| Setaria glauca | 0 | 0-10 | 80 | 90-100 | 80-90 |
| Cyperus rotundus | 70-80 | 90-100 | 0 | 20 | 100 |
| Cyperus difformis | 90 | 100 | 0 | 0-20 | 100 |
| Cyperus esculentus | 50 | 80 | 20 | 40 | 80 |
| Cyperus esagrostis | 80 | 90-100 | 40 | 70 | 100 |

NOTE.—0=No damage. 100=Total destruction.

These results show that the herbicides according to the invention have a surprising action on broadleaved and grassy weeds and, in particular exhibit selectivity which could not be inferred from the action of the components of the mixture.

EXAMPLE 2

A field with rice (Oryza sativa), Indian corn (Zea mays), ladysthumb (Polygonum persicaria), chickweed (Stellaria media), meadow grass (Poa trivialis), barnyard grass (Echinochloa crus-galli), foxtail species (Setaria sp.) and purple nutsedge (Cyperus rotundus) growing on it is treated per hectare with the mixture of 1 kg. of 3-isopropyl-2,1,3-benzothiadiazinone-(4)-2,2-dioxide and 1 kg. of 1-(α,α-dimethyl-β-acetoxypropionyl)-3-isopropyly-2,4-dioxodecahydroquinazoline dispersed in 500 liters of water per hectare. After 14 days it is ascertained that all broadleaved and grassy weeds are almost completely withered; no damage to rice and Indian corn is observed.

EXAMPLE 3

The plants barley (Hordeum vulgare), wheat (Triticum vulgare), rye (Secale cereale), camomile (Matricaria chamomilla), false comomile (Matricaria maritima), corn comomile (Anthemis arvensis), ladysthumb (Polygonum persicaria), corn marigold (Chrysanthemum segetum), henbit (Lamium amplexicaule), catchweed bedstraw (Galium aparine), perennial rye grass (Lolium perenne), slender foxtail (Alopecurus myosuroides), annual bluegrass (Poa annua) and silky bent grass (Apera spica venti) are treated in a greenhouse at a growth height of 6 to 20 cm. with amounts corresponding to 2 and 3 kg. hectare of 3-isopropyl-2,1,3-benzothiadiazinone-(4)-2,2-dioxide (I), with amounts corresponding to 1 and 3 kg. per hectare of N-[1- or 2-(3a,4,5,6,7,7a - hexahydro - 4,7 - methanoindanyl)]-N',N'-dimethylurea (III), and with a mixture of active ingredients I and III (2 kg. per hectare of I+1 kg. per hectare of III), these amounts of the active ingredients each being dispersed in 500 liters of water per hectare. After 8 to 14 days it is ascertained that the mixture of I+III has, compared with the individual active ingredients I and III, a superior herbicidal action and more favorable selectivity on crop plants.

The results of the experiment are given in the following table:

|  | Active ingredients | | | | Mixture |
|---|---|---|---|---|---|
|  | I | | III | | I+III |
| Application rate kg./hectare | 2 | 3 | 1 | 3 | 2+1 |
| Crop plants: | | | | | |
| Hordeum vulgare | 0 | 0-10 | 0-10 | 30-40 | 0-10 |
| Triticum vulgare | 0 | 0 | 0 | 30 | 0 |
| Secale cereale | 0 | 0-10 | 0-10 | 30 | 0-10 |
| Unwanted plants: | | | | | |
| Matricaria chamomilla | 100 | 100 | 90 | 100 | 100 |
| Matricaria maritima | 90 | 100 | 90 | 100 | 100 |
| Anthemis arvensis | 100 | 100 | 90 | 100 | 100 |
| Sinapis arvensis | 90 | 90-100 | 90-100 | 100 | 100 |
| Polygonum persicaria | 100 | 100 | 40 | 60-70 | 100 |
| Chrysanthemum segetum | 100 | 100 | 70 | 100 | 100 |
| Lamium amplexicaule | 80 | 100 | 70 | 90 | 100 |
| Galium aparine | 70 | 90 | 10-20 | 30-40 | 90 |
| Lolium perenne | 0-10 | 10 | 90-100 | 100 | 100 |
| Alopecurus myosuroides | 10 | 10-20 | 100 | 100 | 100 |
| Poa annua | 10 | 10-20 | 100 | 100 | 100 |
| Apera spica venti | 10 | 10-20 | 100 | 100 | 100 |

NOTE.—0=No damage. 100=Total destruction.

These results show that the herbicides according to the invention have a surprising action on broadleaved and grassy weeds and, in particular, exhibit selectivity which could not be inferred from the action of the components of the mixture.

EXAMPLE 4

A site with barley (Hordeum vulgare), wheat (Triticum vulgare), rye (Secale cereale), corn camomile (Anthemis arvensis), camomile (Matricaria chamomilla), catchweed bedstraw (Galium aparine), white goosefoot (Chenopodium album), chickweed (Stellaria media), slender foxtail (Alopecurus myosuroides), silky bent grass (Apera spica venti), meadow grass (Poa trivialis) and perennial rye grass (Lolium perenne) growing on it is treated per hectare, at a growth height of the plants of 3 to 20 cm., with a mixture of 1 kg. of 3-isopropyl-2,1,3-benzothiadiazinone-(4)-2,2-dioxide and 1 kg. of N-[1- or 2-(3a, 4, 5, 6, 7, 7a-hexahydro-4,7-methanoindanyl)]-N',N'-dimethylurea, this 2 kg. mixture being dispersed in 500 liters of water per hectare. After 14 days it is ascertained that the broadleaved and grassy weeds are almost completely withered, whereas the crop plants barley, wheat and rye continue to grow without damage.

EXAMPLE 5

In a greenhouse, the plants barley (Hordeum vulgare), wheat (Triticum vulgare), rye (Secale cereale), camomile (Matricaria chamomilla), corn camomile (Anthemis arvensis), corn marigold (Chrysanthemum segetum), henbit (Lamium amplexicaule), catchweed bedstraw (Galium aparine), annual bluegrass (Poa annua), slender foxtail (Alopecurus myosuroides) and silky bent grass (Apera spica venti) are treated at a growth height of 4 to 18 cm. with amounts corresponding to 1.5 and 3 kg. per hectare of 3-isopropyl-2,1,3-benzothiadiazinone-(4)-2,2-dioxide (I), with amounts corresponding to 1.5 and 3 kg. per hectare of 1-phenyl-4-amino-5-bromopyridazone-(6)(IV), and with a mixture consisting of an amount corresponding to 1.5 kg. per hectare of active ingredient I and an amount corresponding to 1.5 kg. per hectare of active ingredient IV, all these amounts of the active ingredients each being dispersed in 500 liters of water.

After 2 to 3 weeks it is ascertained that the mixture of active ingredients I+IV has a herbicidal action superior to that of the individual active ingredients I and IV.

The results of the experiment are given in the following table:

|  | Active ingredient | | | | Mixture |
|---|---|---|---|---|---|
|  | I | | IV | | I+IV |
| Application rate kg./hectare | 1.5 | | 1.5 | 3 | 1.5+1.5 |
| Crop plants: | | | | | |
| Hordeum vulgare | 0 | 0-10 | 0-10 | 30 | 0-10 |
| Triticum vulgare | 0 | 0 | 0 | 20-30 | 0 |
| Secale cereale | 0 | 0-10 | 0-10 | 20-30 | 0-10 |
| Unwanted plants: | | | | | |
| Matricaria chamomilla | 100 | 100 | 80 | 100 | 100 |
| Matricaria maritima | 90 | 100 | 70 | 90-100 | 90-100 |
| Anthemis arvensis | 100 | 100 | 80-90 | 90-100 | 100 |
| Chrysanthemum segetum | 100 | 100 | 90 | 100 | 100 |
| Lamium amplexicaule | 70-80 | 100 | 80 | 100 | 90-100 |
| Galium aparine | 60 | 90 | 50 | 80 | 90 |
| Poa annua | 0-10 | 10-20 | 90-100 | 100 | 90 |
| Alopecurus myosuroides | 0-10 | 10-20 | 80-90 | 100 | 90 |
| Apera spica venti | 0-10 | 10-20 | 100 | 100 | 100 |

NOTE.—0=No damage. 100=Total destruction.

EXAMPLE 6

On an agricultural site the plants barley (*Hordeum vulgare*), wheat (*Triticum vulgare*), rye (*Secale cereale*), annual blue grass (*Poa annua*), ladysthumb (*Polygonum persicaria*), catchweed bedstraw (*Galium aparine*), slender foxtail (*Alopecurus myosuroides*) and wild oats (*Avena fatua*) are treated at a growth height of 3 to 20 cm. with 1.5 kg. per hectare of 3-isoproply-2,1,3-benzothiadiazinone-(4)-2,2-dioxide (I), with 0.75 kg. per hectare of N-[1- or 2-(3a,4,5,6,7,7a-hexahydro-4,7-methanoindanyl)]-N',N'-dimethylurea (III), with 0.75 kg. per hectare of 1-phenyl-4-amino-5-bromopyridazone-(6) (IV), and with a mixture consisting of 1.5 kg. per hectare of I+0.75 kg. hectare of III+0.75 kg. per hectare of IV, all these amounts of the active ingredients each being dispersed in 500 liters of water per hectare. After 4 weeks, the action of the active ingredients and the mixture on the crop plants and broadleaved and grassy weeds is ascertained by determining their fresh weight (mean figures taken as relative values compared with untreated plants (=100). It is ascertained that the fresh weight of cereals from the treated plots, and particularly in the case of the mixture of I+III+IV, is in some instances somewhat higher than in the case of the untreated plots, and the weight of the broadleaved and grassy weeds, in contrast to the untreated plots, decreases to such a great extent that only a few grams can be ascertained.

The results of the experiment are given in the following table:

EXAMPLE 7

In a greenhouse, the plants large crabgrass (*Digitaria sanguinalis*), barnyard grass (*Echinochloa crus-galli*), green foxtail (*Setaria viridis*), yellow nutsedge (*Cyperus esculentus*), bermudagrass (*Cynodon dactylon*) and redroot pigweed (*Amaranthus retroflexus*) are treated at a growth height of 3 to 20 cm. with 1.5 kg. per hectare of 3-isopropyl-2,1,3-benzothiadiazinone-(4)-2,2-dioxide (I), with 0.75 kg. per hectare of N-[1- or 2-(3a,4,5,6,7,7a-hexahydro-4,7-methanoindanyl)]-N',N'-dimethylurea (III), with 0.75 kg. per hectare of 1-phenyl-4-amino-5-bromopyridazone-(6) (IV), and with a mixture consisting of 1.5 kg. per hectare of I+0.75 kg. per hectare of III+0.75 kg. per hectare of IV, all of these amounts of active ingredients each being dispersed in 500 liters of water per hectare. After 4 weeks, the action of the active ingredients and the mixture on the plants is ascertained by determining their fresh weight (mean figures taken as relative values compared with untreated plants (=100)). It is ascertained that the mixture of I+III+IV has, in comparison to the individual active ingredients reduced the weight of the plants to a very considerable extent.

The results of the experiment are given in the following table:

| Active ingredient | Application rate | Fresh weight (relative) | | | | | |
|---|---|---|---|---|---|---|---|
|  |  | Digitaria sanguinalis | Echinochloa crusgalli | Setaria viridis | Cyperus esculentus | Cynodon dactylon | Amaranthus retroflexus |
| Untreated |  | 100 | 100 | 100 | 100 | 100 | 100 |
| I | 1.5 | 89.5 | 88.9 | 85 | 19.8 | 100 | 99.8 |
| III | 0.75 | 20 | 5.4 | 25.5 | 80 | 25 | 80 |
| IV | 0.75 | 25.2 | 30 | 14.9 | 90 | 61.3 | 24.9 |
| I+III+IV | 1.5+0.75.0.75 | 3.7 | 1.6 | 2.3 | 9.4 | 0.4 | 5.8 |

EXAMPLE 8

On an agricultural site the plants Indian corn (*Zea mays*), annual bluegrass (*Poa annua*), barnyard grass (*Echinochloa crusgalli*), purple nutsedge (*Cyperus rotundus*) and ladysthumb (*Polygonum persicaria*) are treated at a growth height of 3 to 20 cm. with 2 kg. per hectare of 3-isopropyl-2,3-benzothiadiazinone-(4)-2,2-dioxide (I), with 0.5 kg. per hectare of 1-(α,α-dimethyl-β-acetoxypropionyl)-3-isopropyl-2,4-dioxodecahydroquinazoline (II), with 0.5 kg. per hectare of N-[1 or 2-(3a,4,5,6,7,7a-hexahydro-4,7-methanoindanyl)]-N',N'-dimethylurea (III), and with a mixture consisting of 2.0 kg. per hectare of I+0.5 kg. per hectare of II+0.5 kg. per hectare of III, all these amounts of the active ingredient each being dispersed in 500 liters of water per hectare. After 4 weeks, the action of the active ingredients and the mixture on the plants is ascertained by determining their fresh weight (mean figures taken as relative values compared with untreated plants (=100)). The fresh weight of Indian corn on the treated plot corresponds approximately to that on the untreated plot, but the weight of the broadleaved and grassy weeds on the treated plot is reduced to such a great extent that only a few grams can be ascertained.

The results of the experiment are given in the following table:

| Active ingredient | Application rate | Fresh weight (relative) | | | | | | | |
|---|---|---|---|---|---|---|---|---|---|
|  |  | Hordeum vulgare | Triticum vulgare | Secal cereale | Poa annua | Polygonum persicaria | Galium aparine | Alopecurus myosuroides | Avena fatua |
| Untreated |  | 100 | 100 | 100 | 100 | 100 | 100 | 100 | 100 |
| I | 1.5 | 101.2 | 105 | 100 | 75.4 | 5.4 | 40 | 89.5 | 95 |
| III | 0.75 | 98.5 | 100 | 96.5 | 25 | 59 | 89.4 | 20 | 25 |
| IV | 0.75 | 100 | 107.5 | 100 | 30.5 | 14.7 | 60 | 36.5 | 89.5 |
| I+III+IV | 1.5+0.75+0.75 | 101.0 | 100 | 102.2 | 12.1 | 2.6 | 24.4 | 14.7 | 10 |

| Active ingredient | Application rate | Fresh weight (relative) | | | | |
|---|---|---|---|---|---|---|
| | | Zea mays | Poa annua | Echinochloa crusgalli | Cyperus rotundus | Polygonum persicaria |
| Untreated | | 100 | 100 | 100 | 100 | 100 |
| I | 2 | 102.7 | 89.0 | 74.5 | 2.3 | 0.9 |
| II | 0.5 | 100 | 21.2 | 28 | 101 | 31.8 |
| III | 0.5 | 98.6 | 11.5 | 25.6 | 91.4 | 67.1 |
| I+II+III | 2+0.5+0.5 | 98.3 | 8.6 | 20.7 | 1.9 | 0.2 |

EXAMPLE 9

On an agricultural site the plants Indian corn (*Zea mays*), catchweed bedstraw (*Galium aparine*), false camomile (*Matricaria maritima*) and slender foxtail (*Alopecurus myosuroides*) are treated at a growth height of 3 to 20 cm. with 2 kg. per hectare of 3-isopropyl-2,3-benzothiadiazinone-(4)-2,2-dioxide (I), with 0.5 kg. per hectare of 1-($\alpha,\alpha$-dimethyl - $\beta$ - acetoxypropionyl)-3-isopropyl-2,4-dioxodecahydroquinazoline (II), with 0.5 kg. per hectare of 1-phenyl-4-amino - 5 - bromopyridazone-(6) (IV), and with a mixture consisting of 2 kg. per hectare of I+0.5 kg. per hectare of II+0.5 kg. per hectare of IV, these amounts of the active ingredients each being dispersed in 500 liters of water per hectare. After 4 weeks, the action of the active ingredients and the mixture on the plants is ascertained by determining their fresh weight (mean figures taken as relative values compared with untreated plants (=100)). In comparison with the untreated plot, the mixture of I+II+IV and the individual components slightly increase the fresh weight of Indian corn; in comparison with the individual components and the untreated plot, the mixture of I+II+IV reduces the fresh weight of *Galium aparine*, *Matricaria maritima* and *Alopecurus myosuroides* to a considerable extent.

The results of the experiment are given in the following table:

| Active ingredient | Application rate | Fresh weight (relative) | | | |
|---|---|---|---|---|---|
| | | Zea mays | Galium aparine | Matricaria maritima | Alopecurus myosuroides |
| Untreated | | 100 | 100 | 100 | 100 |
| I | 2 | 104.3 | 28.6 | 1.8 | 89.5 |
| II | 0.5 | 101.6 | 67 | 80.0 | 24.7 |
| IV | 0.5 | 100.2 | 73.9 | 55.7 | 23.8 |
| I+II+IV | 2+0.5+0.5 | 102.3 | 25.7 | 0.5 | 18.4 |

I claim:
1. A herbicide containing a herbicidally effective amount of a mixture consisting essentially of
   (a) a compound having the formula

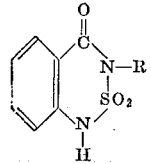

wherein
   R denotes isopropyl, ethyl or methyl, and the salts thereof
   (b) 1-phenyl-4-amino-5-bromopyridazone-(6) in a respective weight ratio of compounds a and b of 4:1 to 1:1.
2. A herbicide as claimed in claim 1 wherein compound (a) is 3-isopropyl-2,1,3-benzothiadiazinone-(4)-2,2-dioxide.
3. A process for controlling the growth of unwanted plants wherein the plants are treated with a herbicidally effective amount of a mixture consisting essentially of
   (a) a compound having the formula

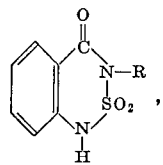

R denoting an isopropyl, ethyl or methyl radical or a salt thereof, and
   (b) 1-phenyl-4-amino-5-bromopyridazone-(6) in a respective weight ratio of compounds a and b of 4:1 to 1:3.
4. A process as claimed in claim 3 wherein compound (a) is 3-isopropyl-2,1,3-benzothiadiazinone-(4)-2,2-dioxide.

References Cited
UNITED STATES PATENTS
3,210,353  10/1965  Reichender et al. _____ 71—92
FOREIGN PATENTS
25,594  1968  Japan _____ 71—91

LEWIS GOTTS, Primary Examiner

C. L. MILLS, Assistant Examiner

U.S. Cl. X.R.
71—92, 119

UNITED STATES PATENT AND TRADEMARK OFFICE
CERTIFICATE OF CORRECTION

PATENT NO. : 3,826,642
DATED : July 30, 1974
INVENTOR(S) : Adolf Fischer

It is certified that error appears in the above-identified patent and that said Letters Patent are hereby corrected as shown below:

First page, insert
--[30] Foreign Application Priority Data
    March 19, 1969    Germany ............ P 19 13 850.2--

Column 8, line 15, "1:1" should read --1:3--.

Signed and sealed this 15th day of July 1975.

(SEAL)
Attest:

RUTH C. MASON
Attesting Officer

C. MARSHALL DANN
Commissioner of Patents
and Trademarks